(No Model.)

E. T. GREENFIELD.
ARMORED CONDUIT.

No. 595,238. Patented Dec. 7, 1897.

Witnesses
Edward C. Rowland.
M. M. Robinson.

Inventor
Edwin T. Greenfield
By his Attorney
Charles J. Kintner

UNITED STATES PATENT OFFICE.

EDWIN T. GREENFIELD, OF NEW YORK, N. Y.

ARMORED CONDUIT.

SPECIFICATION forming part of Letters Patent No. 595,238, dated December 7, 1897.

Application filed July 27, 1897. Serial No. 646,099. (No model.)

*To all whom it may concern:*

Be it known that I, EDWIN T. GREENFIELD, a citizen of the United States, residing at New York, in the county of New York and State of New York, have made a new and useful Invention in Armored Conduits, of which the following is a specification.

My invention is directed particularly to a novel form of flexible armored conduit adapted especially for surrounding or protecting electrical conductors—such, for instance, as are used in connection with systems of electric lighting and the like; and its objects are, first, to devise such an armored conduit which may be cheaply constructed and which will effectually protect such conductors under all conditions of usage; second, to devise a flexible armored conduct which will possess such flexibility as to enable it to be used in conveying conductors around corners or angles where the curvatures are necessarily abrupt and without any danger of damaging it, (the conduit.)

My novel form of flexible conduit will be fully understood by referring to the following specification, and also to the claims at the end thereof, where the essential points of novelty are particularly pointed out.

For a full and clear understanding of the invention reference is also had to the accompanying drawings, in which—

Figure 1:
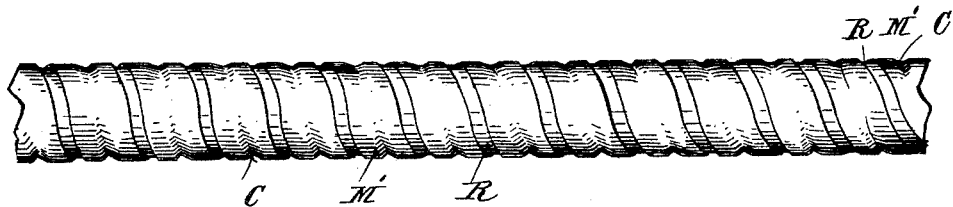
Figure 2:
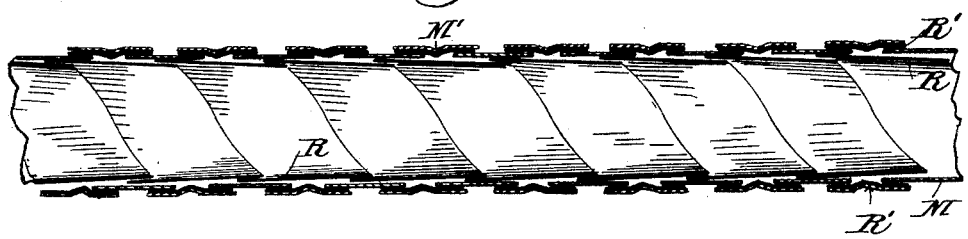
Figure 3:
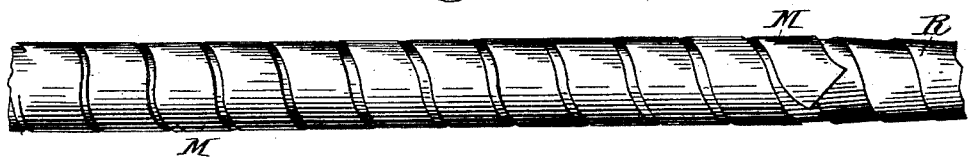

Figure 1 illustrates in side elevational view a short section of my improved flexible conduit; and Fig. 2, a slightly-enlarged sectional view thereof, illustrating also the elements thereof slightly separated from each other for the purpose of enabling its structure to be better understood. Fig. 3 is a side elevational view of a similar section of the conduit partially completed, and Fig. 4 a similar side elevational view of the interior insulating-lining thereof.

Figure 4:
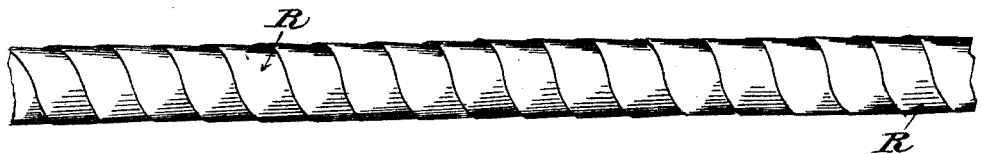

My novel flexible conduit is constructed by first winding a strip of soft rubber R, Fig. 4, upon a flexible or expansible mandrel, the adjacent edges of said strip being preferably coated with benzin, alcohol, or any well-known agent which will cause the same to adhere to each other when so wound. Upon this strip of rubber I now wind a second strip of thin sheet metal M, such as iron, the convolutions or windings thereof being separated from each other and the body portion thereof breaking joints with the joints of the rubber strip R. (See Fig. 3.) About the outer surface of the metal strip M, I now wind a second strip of rubber R', the convolutions or windings of which are separated from each other by a definite space, as were the like convolutions or windings of the metal strip M, as clearly shown in Fig. 2. I now wind around the entire structure a third strip M' of metal substantially like the first strip M, with the difference, however, that this third strip is corrugated centrally, as shown at C, Fig. 1, the corrugation being of such a nature and so located that it fits accurately within the space left by the edges of the adjacent windings or convolutions of the strip M and at the same time bears firmly down upon the rubber strip R' in such manner as to cause its inner surface to abut firmly against the inner strip R of rubber. This central corrugation C serves also the additional and very important function of preventing the outer metallic strip M' from unwinding from around the inner strips when the conduit is severed at any point.

I may wind in the manner described any number of alternate strips of rubber and metal and may unite the same together by any adhesive paste—such, for instance, as rubber-cement.

After the conduit has been constructed as described I release and withdraw the expansible mandrel and subject it (the conduit) to the well-known process of vulcanization and thereby vulcanize the rubber parts thereof to any desired degree, thus uniting the whole structure firmly together. Under some conditions of usage it might not be deemed best to vulcanize at all, rubber-cement being a sufficient binding agent; but in case the conduit is to be used in positions surrounding steam-pipes, boilers, flues, and other places where unnatural heat exists it should be vulcanized to such a degree of hardness as will naturally suggest itself to those skilled in the art.

In place of making the interior tube R of spiral convolutions the same might be an ordinary flexible rubber tube with the convolutions of metal and rubber alternately wound around it, as before, and the entire structure vulcanized together. In this event the conduit might be constructed without the use of an interior expansible sustaining-mandrel.

Although I have hereinbefore described the insulating material of which the alternate layers of my improved conduit are made as of soft rubber, it is to be understood that the same may be of other pliable materials, such as fabrics coated with soft rubber, or of such materials as, when wound in the manner described, could be united together in one mass with one or more successive layers of spirally-wound armors and the entire mass still retain the desired flexibility and water-resisting and insulating qualities.

I am aware that ocean-cables have heretofore been constructed in which the conductor itself was surrounded with rubber, jute, &c., and this in turn surrounded with a spirally-wound armor of wire, the spirals running either all in the same direction or one layer in one direction and a second in a reverse direction, the alternate layers being thus applied to the desired thickness, and I make no claim broad enough to include such structure, my broadest claim being to a flexible conduit of the nature described designed to cover or surround removable conductors.

Having thus described my invention, what I claim, and desire to secure by Letters Patent of the United States, is—

1. An armored conduit consisting of a flexible interior insulating-tube and one or more spirally-wound layers of metal secured thereto, substantially as described.

2. An armored conduit consisting of a flexible interior insulating-lining and a spirally-wound coating of metal secured thereto, substantially as described.

3. An armored conduit consisting of a flexible insulating-lining and a metallic armor surrounding the same and secured thereto, the successive parts of said metallic coating being separated from each other by definite spaces whereby the armor and its coating are rendered flexible, substantially as described.

4. An armored conduit consisting of a flexible insulating-lining and one or more surrounding metallic protecting-armors, the successive parts of said armor or armors being disconnected from each other and all united to the insulating-lining, substantially as described.

5. An armored conduit consisting of a flexible insulating-lining and alternate layers of spirally-wound strips of metal separated from each other by layers of insulating material and all united together, substantially as described.

6. An armored conduit-tube consisting of an insulating-lining surrounded by alternate layers of metal armor and insulating material, the entire structure being of a flexible nature, substantially as described.

7. An armored conduit consisting of an insulating-lining surrounded by alternate layers of spirally-wound armor and spirally-wound insulating material, the outer winding of armor being corrugated and so located about the winding of insulating material which it surrounds as to compress it against the next succeeding inner layer, all of said parts being united together so as to constitute a flexible conduit, substantially as described.

8. An armored conduit consisting of alternate layers of spirally-wound insulating material and metal armor breaking joints with each other and united together so as to constitute a water-tight flexible conduit, substantially as described.

9. An armored conduit consisting of alternate layers of spirally-wound insulating material and metal armor, all of said windings being united together by a waterproof adhesive agent, substantially as described.

10. An armored conduit consisting of alternating layers of spirally-wound sheet-rubber or rubber cloth and metal armor, said layers being united together by the process of vulcanization, substantially as described.

In testimony whereof I have hereunto subscribed my name this 19th day of July, 1897.

EDWIN T. GREENFIELD.

Witnesses:
W. E. MANDELICK,
C. J. KINTNER.